United States Patent [19]

Hack

[11] 3,941,353

[45] Mar. 2, 1976

[54] DEVICE FOR RELEASABLY HOLDING A MOVABLE BODY

[75] Inventor: Eugen Hack, Nurnberg, Germany

[73] Assignee: Georg Muller Kugellager-Fabrik KG, Nurnberg, Germany

[22] Filed: Oct. 16, 1974

[21] Appl. No.: 515,357

[30] Foreign Application Priority Data

Oct. 22, 1973 Germany............................ 2352836

[52] U.S. Cl................. 254/124; 269/32; 269/254 R
[51] Int. Cl.² ............................................ B66F 3/00
[58] Field of Search.......... 254/93 R, 104, 124, 126; 269/48.1, 254 R, 32; 72/392, 148

[56] References Cited
UNITED STATES PATENTS

| | | | |
|---|---|---|---|
| 2,482,367 | 9/1949 | Ravers................................ | 254/126 |
| 2,620,737 | 12/1952 | Miller................................ | 254/124 |
| 3,292,903 | 12/1966 | Meyer et al......................... | 254/124 |
| 3,635,440 | 1/1972 | Van Gompel....................... | 254/124 |

FOREIGN PATENTS OR APPLICATIONS

| | | | |
|---|---|---|---|
| 1,813,557 | 1/1969 | Germany............................ | 254/93 R |

*Primary Examiner*—Al Lawrence Smith
*Assistant Examiner*—Robert C. Watson
*Attorney, Agent, or Firm*—Steinberg & Blake

[57] ABSTRACT

A device for releasably holding a movable body in a given position with respect to another body includes a pair of opposed mutually spaced end walls and a pair of opposed mutually spaced fixed walls extending between the fixed to the end walls to form therewith a frame which surrounds a given space. A control plate is situated in the latter space for movement between the end walls in a clamping direction or in a non-clamping direction, and on opposite sides of the control plate are a pair of parallel clamping plates which are parallel to the control plate while being spaced therefrom. Situated between the control plate and the pair of clamping plates are two rows of tiltable spreading elements which in response to movement of the control plate in the clamping direction tilt to spread at least one of the clamping plates away from the other while maintaining the clamping plates parallel to each other with the tiltable spreading elements tilting in an opposite direction in response to movement of the control plate in the non-clamping direction to permit at least the movable clamping plate to move back toward the other clamping plate, with at least this movable clamping plate adapted to press against a movable body for releasably holding the latter in a given position when the movable clamping plate is spread away from the other clamping plate while when the control plate moves in the non-clamping direction the movable clamping plate is released for movement to a release position adapted to release the movable body for movement. A spring is operatively connected at least with the movable clamping plate to urge the latter toward its release position, and at least the movable clamping plate is completely separate from and unconnected with the frame so as to be freely movable with respect thereto.

10 Claims, 3 Drawing Figures

DEVICE FOR RELEASABLY HOLDING A MOVABLE BODY

BACKGROUND OF THE INVENTION

The present invention relates to devices for releasably holding a movable body in a given position with respect to another body.

Thus, the device of the present invention may be used in machine tools which have bodies at least one of which is movable relative to the other, for the purpose of releasably holding such a movable body in a predetermined position with respect to the other body.

The present invention relates in particular to that type of device where a frame is formed by a pair of opposed end walls and a pair of opposed fixed walls which extend between and are fixed to the end walls, with a pair of opposed clamping walls extending across the space between the fixed walls and being spreadable apart from each other to a holding position pressing against bodies as referred to above for releasably holding at least one movable body at a given position with respect to the other body.

Such a device may include between the clamping walls a control plate which is shiftable between the end walls in clamping and non-clamping directions with two rows of tiltable spreading bodies situated on opposite sides of the control plate and engaging the latter as well as inner surfaces of the clamping walls. Suitable springs act on the spreading bodies to urge the latter to tilt in response to movement of the control plate in a clamping direction for spreading at least one of the clamping walls away from the other so that the device will assume its position pressing against the movable body to releasably hold the latter at a predetermined position.

A device of the above general type is disclosed, for example, in the German publication DAS 16 27 043. With this known holding device the clamping walls form a one-piece housing with the end walls and fixed walls which extend therebetween. The spreading of the clamping walls apart from each other to provide the required clamping action is brought about by deformation or bending of these clamping walls which form a unit with the remainder of the housing.

Another type of known clamping device of the above general type is disclosed in German patent 1,750,592. With this type of clamping device the opposed clamping walls are connected with the remainder of the housing either by being bolted or pinned thereto, so that in this case also the required clamping action which is achieved by spreading of the clamping walls apart from each other results from deformation or bending of these clamping walls.

Both of the above types of known clamping devices have the disadvantage of providing, on the one hand, only an extremely reduced clamping force as a result of the required deformation of the clamping walls and on the other hand of producing a non-uniform clamping force which varies along each clamping wall depending upon the extent to which the latter is curved with the clamping force being practically zero at the location where the clamping walls are connected to the remainder of the housing.

With the second of the above known devices where the clamping walls are connected with the remainder of the housing by being bolted or pinned thereto, there is a certain advantage in the ease with which the parts are assembled, but on the other hand there is the disadvantage that axial movement will provide at the clamping wall a jamming or shearing of the connecting bolt or pin. In the event that this latter disadvantage occurs, then the spreading elements will no longer return to their initial positions after a clamping operation, in readiness for the next clamping operation, and the entire device must be completely disassembled, with this latter operation in itself providing the possibility of breaking of individual spreading elements.

The first of the above-mentioned known types of clamping devices which are representative of the state of the art has the further disadvantage of rendering the assembly of the components and in particular the introduction of the spring-loaded spreading elements extremely difficult to carry out because of the one-piece construction of the unit which includes the clamping walls, while the second of the above devices which represent the state of the art has the disadvantage of requiring a relatively complex construction.

SUMMARY OF THE INVENTION

It is accordingly a primary object of the present invention to provide a device which will avoid the above drawbacks.

In particular, it is an object of the present invention to provide a device of the above general type which has a simple construction and which is made up of components which can be easily assembled.

A further object of the present invention is to provide a device of the above general type which is capable of achieving a highly effective releasable holding force without necessitating deformation or bending of a clamping wall.

Furthermore it is an object of the present invention to provide a device of the above general type which can be manufactured as a complete unit which is available to be placed in its position of use without requiring additional components to aid in the placing of the device in its position of use.

According to the invention the device is adapted to be situated in a position of use where it is capable of releasably holding a movable body in a given position with respect to another body. The device of the invention includes a pair of spaced opposed end walls and a pair of spaced opposed fixed walls extending between and fixed to the end walls to form therewith a frame which surrounds a given space. A pair of opposed clamping walls extend across the latter space between the fixed walls with at least one of these clamping walls being completely separate from and unconnected to the other walls while being spreadable away from the other clamping wall into engagement with the movable body for releasably holding the latter in a desired position. These clamping walls are parallel to each other and situated therebetween is a movable control plate which is also parallel to the clamping walls, this control plate being moved by a suitable moving means either in a clamping direction between the end walls or in a non-clamping direction between the end walls. The control plate has a pair of opposed faces which are respectively directed toward inner surfaces of the clamping plates which are directed toward each other, and two rows of spreading means, which form mirror images of each other, are respectively situated on opposite sides of the control plate in engagement with the opposed faces thereof while having distant from the latter faces end surfaces respectively engaging the inner surfaces of the clamping walls. A plurality of spring means act on the rows of spreading means to urge them to tilt, in response to movement of the control plate in a clamping direction, in a direction which will spread at least the one movable clamping wall away from the other clamping wall, while maintaining the movable clamping wall parallel to the other clamping wall, the movable clamping wall in this case being spread to a holding position where it is adapted to press against the movable body for releasably holding the latter in a given position. An urging means is operatively connected at least with the one movable clamping wall for urging the latter to a release position adapted to release the movable body for movement, in response to movement of the control plate in the non-clamping direction with the rows of spreading means now tilting in the opposite direction to permit at least the one movable clamping wall to be displaced by the urging means to its release position.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
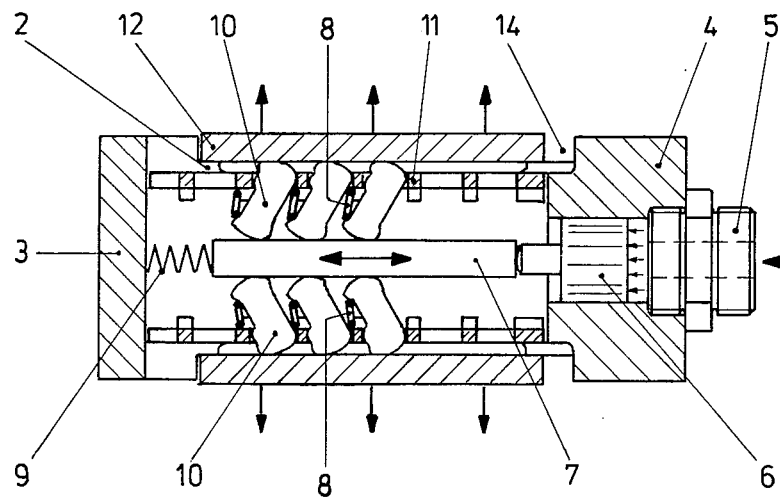
FIG. 1 is a partly schematic longitudinal sectional elevation of one embodiment of a device according to the invention.
Figure 2:
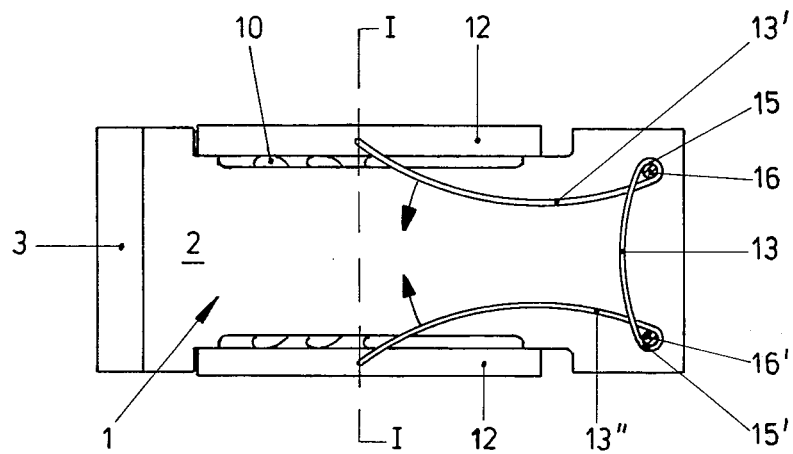
FIG. 2 is a longitudinal side elevation of part of the device of FIG. 1.
Figure 3:
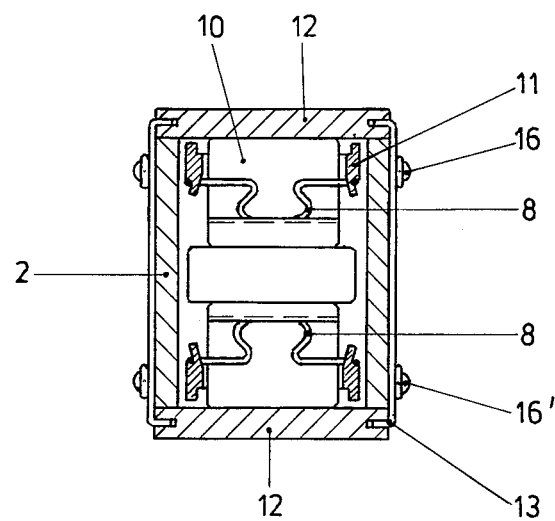
FIG. 3 is a transverse sectional elevation of the device of FIGS. 1 and 2 taken along line I—I of FIG. 2.

Referring now to FIGS. 1–3, the embodiment of the invention which is illustrated therein includes a rigid frame 1 made up of a pair of mutually spaced opposed end walls 3 and 4 and a pair of opposed parallel fixed walls 2 which are also spaced from each other and which extend between and are fixed to the end walls 3 and 4. Thus these walls 2–4 form the frame 1 which surrounds a predetermined space. The end wall 4 is formed with a bore passing centrally therethrough and defining a cylinder for a slidable piston 6. The right end of the bore which receives the piston 6, as viewed in FIG. 1, is fluid-tightly connected with a tubular connector element 5 adapted to be connected with any suitable source of fluid under pressure which flows into the tubular connector 5 from the right toward the left, as designated by the arrow shown at the right of FIG. 1. Thus the fluid which is under pressure will act on the right face of the piston 6, as viewed in FIG. 1, in order to urge the latter toward the left, as viewed in FIG. 1, and as is indicated by the small arrows at the right face of the piston 6 in FIG. 1.

The piston 6 carries at its left end, opposite to the face thereof which is acted upon by the fluid under pressure, an elongated portion of reduced diameter which directly presses against the right end of an elongated control plate 7 so that the control plate 7 can be moved to the left, in a non-clamping direction, as will be apparent from the description below, when the piston 6 is displaced to the left, as viewed in FIG. 1. As is schematically indicated in FIG. 1, a compression spring 9 is in a compressed condition between the end wall 3 and the left end of the control plate 7, as viewed in FIG. 1, so that the spring 9 seeks to expand and move the control plate 7, together with the piston 6, to the right, as viewed in FIG. 1, in a clamping direction, as will be apparent from the description below. Thus the control plate 7 is adapted to move in the opposite directions indicated by the double-headed arrow in FIG. 1.

On both sides of the control plate 7, in engagement with its upper and lower faces, as viewed in FIG. 1, are rows of spreader means 10 which are tiltable and which are arranged so that the lower row of spreader means 10 forms a mirrow image of the upper row of spreader means 10. The end regions of the plurality of spreader elements 10 which are distant from the control plate 7 respectively extend through openings of a pair of cages 11 carried, for example, by the end walls 3 and 4 by way of springs compressed between these walls and the cages. In line with their transverse portions, between which the openings thereof are defined, the cages 11 have projections which engage the free ends of a plurality of spring means 8 which respectively act on the plurality of spreader means 10 for urging the latter to tilt in the clamping direction. Thus, the upper row of springs 8 of FIG. 1 act on the lower end regions of the upper row of spread elements 10 so as to tend to cause the latter to rock in the direction displacing the lower ends of the upper row of spreader elements 10 toward the right, as viewed in FIG. 1, and such action takes place during displacement of the control plate 7 toward the right under the action of the spring 9 in the clamping direction. In the same way, the lower row of springs 8 act on the upper end regions of the lower row of spreader means 10 to cause the upper end regions of the latter to rock while moving to the right, as viewed in FIG. 1, upon displacement of the plate 7 in the clamping direction.

The end surfaces of the rows of spreader means 10 which are distant from the clamping plate 7 respectively engage inner surfaces of a pair of opposed clamping walls 12 which are parallel to each other as well as to the control plate 7 and which have no connection with the frame 1 so that the pair of clamping walls 12 are freely movable with respect to the frame 1. These clamping walls 12 thus extend across the space surrounded by the frame 1 and the clamping walls 12 are shown in the drawings in their release or non-holding position where they are closest to each other and engage not only the extreme upper and lower end surfaces of the upper and lower rows of spreader means 10 but also edge regions extending longitudinally of the fixed plates 2, these plates 2 being respectively formed with elongated notches at their upper and lower edges for receiving the clamping walls 12 in the manner illustrated in the drawings.

An urging means is provided for urging the clamping plates 12 toward each other to the illustrated release position, in opposition to the tendency of the plurality of spreader means 10 to spread the clamping plates 12 apart from each other under the action of the springs 8. In the illustrated example this urging means takes the form of a pair of wire springs 13 between which the fixed walls 2 are located with these wire springs 13 extending along the exterior of the walls 2, respectively, as is apparent from FIGS. 2 and 3. Each wire spring 13 has a pair of curved springy legs 13' and 13'' which respectively terminate in free ends respectively received in suitable bores formed in the side edge of each plate or wall 12, and these legs 13' and 13'' tend, due to their inherent resiliency, to move toward each other, as indicated by the arrows in FIG. 2, so that the springs 13 seek to hold the walls 12 in the release position shown in the drawings where they are closest to each other. Thus, the pair of springs 13 are stronger than and overcome the force of the plurality of spring means 8 so as to hold the walls 12 in engagement with the outer ends of the spreader elements 10 and in engagement with the frame 1 when the parts are in the position shown in the drawings. The notches 14 of the fixed walls 2 which receive the side edge regions of the clamping walls 12 are apparent from FIGS. 1 and 2. In addition it will be noted that the wire springs 13 hold the clamping walls 12 in positions pressing inwardly against the outer ends of the spreader elements 10 so that in this way the springs 13 serve to maintain the components of the device in their assembled condition.

As is apparent from FIG. 2, each spring 13 has centrally between the legs 13' and 13" thereof, symmetrically arranged with respect thereto, a curved central region which forms with the legs a pair of loops 15 and 15'. The walls 2 are respectively provided at their right end regions, as viewed in FIG. 2, with outwardly directed projections 16 and 16' which are fixed to the walls 2 and which are respectively received in the loops 15 and 15', so that in this way the springs 13 are carried by the frame 1. By way of this construction of the wire springs 13 in the form of springs each having a pair of springy legs and a pair of loops, on the one hand the spring action is achieved to provide the required spring force and on the other hand an extremely favorable assembly of the pair of springs 13 with the farme is achieved.

As is apparent from FIG. 3, the free ends of the legs 13' and 13" extend at right angles to these legs into the bores formed in the side edge regions of the clamping walls 12. In this way a secure connection at the walls 12 is assured.

The plurality of spreader means 10 utilized in the device of the invention can, for example, advantageously take the form of the clamping or control bodies which are customarily used in overrunning, one-way clutches. For example, such clutch bodies are described in the German publication DAS 1,300,743. These bodies which form the plurality of spreader means 10 are respectively formed at their end regions adjacent the control plate 7, at the left sides of these end regions, as viewed in FIG. 1, with transversely extending grooves which are directed toward the cages 11 and which are formed in projecting portions of the bodies 10 which project toward the left, as viewed in FIG. 1, so that these parts of the bodies 10 serve as spacer portions with the grooves serving to receive the intermediate bowed portions of the springs 8, as is most clearly shown in FIG. 3. The springs 8 have the configuration shown most clearly in FIG. 3 according to which they have a substantially meander-shaped configuration with the central bowed portion of each spring 8 being joined at its free ends distant from the groove which receives the bowed portion to a pair of transversely extending free ends of each spring 8. These free ends of the spring 8 are received against the adjacent cage 11 next to a pair of opposed projections thereof. Such springs are shown, for example, in German patent 1,231,970. However, it is to be understood that any other type of spreader body and spring arrangement can be used in the device of the invention, as appears to the person skilled in the art on the basis of his experience.

When the above-described device of the invention is to be used, it is placed between a pair of bodies one of which is movable relative to the other, although it can also be placed between a pair of bodies both of which move, with one of these bodies being moved relative to the other. Thus, the device can be situated between a pair of bodies forming part of a machine tool, for example, with the clamping plates or walls 12 situated between the bodies at least one of which is movable relative to the other. When the parts are in the position shown in the drawings, one or both of these bodies of a machine tool or the like can move freely with respect to the other. When one of these movable bodies reaches a predetermined position, the pressure of the fluid acting on the piston 6 is reduced in any suitable way, so that the spring 9 can expand to displace the control plate 7 toward the right, as viewed in FIG. 1, in the clamping direction. This will release the plurality of spreader means 10 to the force of the plurality of spring means 8, causing the plurality of spreader means 10 to rock and spread the pair of clamping walls 12 apart from each other as shown by the upwardly and downwardly directed arrows of FIG. 1. Thus, if both of the bodies between which the device of the invention is located are movable, the pair of clamping walls 12 will be spread apart from each other into pressing engagement with the bodies for releasably holding the latter in the predetermined location. On the other hand, if one of these bodies is fixed, then only one of the clamping walls 12 will be spread away from the other to a holding position pressing against the body which is to be releasably held in the given location. When it is desired again to release such a body or bodies for movement, the pressure of the fluid acting on the piston 6 is increased to displace the piston 6 toward the left, as viewed in FIG. 1, in the non-clamping or release direction, thus further compressing the spring 9 and enabling the spreader means 10 to rock back to their position shown in FIG. 1 while the springs 13 act to return one or both of the clamping walls 12 to the release position shown in the drawings. Thus, in order to bring about the clamping action it is only necessary to reduce the fluid pressure acting on the piston 6 to a value which will enable the spring 9 to expand.

Of course, it is also possible to reverse the above arrangement and to provide the clamping direction of movement of the control plate 7 with an increase in pressure of the fluid acting on the piston 6 while the spring 9 yields and expands to return the control plate 7 in the non-clamping or release direction. For this purpose it is only necessary to interchange the locations of the walls 3 and 4 and the structure cooperating therewith, so that the spring 9 and the wall 3 would in this case be located at the right of FIG. 1 while the wall 4 together with the piston 6 and the connector 5 would be situated at the left of FIG. 1. Also, such an arrangement can be provided by simply changing the assembly shown in the drawings so that the spreader means 10 are tilted in a direction opposite to that shown in FIG. 1 with the several springs 8 acting in this case on the right sides of the oppositely tilted elements 10, as viewed in the drawings. The particular arrangement which is chosen will depend upon the particular requirements at a given installation where the device of the invention is used. However the arrangement shown in FIG. 1 is preferred inasmuch as if there should be a sudden unforeseen drop of pressure in the fluid acting on the piston 6, the spring 9 will immediately act to displace the control plate 7 in the clamping direction, thus arresting the parts against any relative movement with respect to each other so that dangerous situations can be avoided in this way.

As is apparent from the above description, with the construction of the invention one or both of the clamping walls 12 is completely separate from the frame 1 so as to be freely movable with respect thereto. Such a movable clamping wall 12 is only placed in engagement with the frame 1, while being maintained in engagement with the spreader elements 10, by the action of the spring 13. It is thus apparent that one or both of the clamping walls 12 are capable of being spread away from each other or moved back toward each other while remaining parallel to each other at all times so that bending or deformation of a clamping wall, as is required by the prior art, is avoided with the present invention. Moreover, the undesirable influence of the clamping action achieved with such deformation is avoided since the holding or clamping force will be spread uniformly over the entire exterior clamping surface of one or both of the clamping walls 12. On the other hand, as a result of the fact that one or both of the walls 12 are separate components unconnected in any way to the remainder of the frame, an exceedingly simple assembly of the device is assured inasmuch as the separate clamping wall or walls are the last element or elements to be assembled with the remainder of the device. In this way an easy access is provided to the interior of the frame 1, as a result of the separate wall or walls 12, and the springs 13 serve as an exceedingly simple and effective means for maintaining the wall or walls 12 assembled with the remainder of the structure. As a result of the forces stored in the plurality of spring means 8, the plurality of spreader means 10 are always in a condition of readiness for producing the spreading action while the forces of the springs 8 are overcome by the forces by the springs 13 for returning the plates 12 to their release position shown in the drawings. Thus, the clamping walls 12 also serve to maintain the plurality of spreader means 10 in a condition of readiness for providing the spreading action. Thus the entire assembly can be completed so as to provide the advantage of having a device which is in a completely constructed condition ready to be received in the installation where the device of the invention is to be used, and the assembled condition of the device is maintained and assured without requiring any additional tools or the like to be used for holding the device of the invention in the condition where it has the minimum dimensions shown in the drawing.

In the case where only one of the clamping walls 12 is unconnected from the remainder of the frame 1 so as to provide the releasable holding action on only one side of the device, the springs 13 are conveniently connected both to the frame and to this one clamping wall 12 which is movable with respect to the remainder of the frame. However in a case where both of the clamping walls 12 are unconnected from the remainder of the frame 1 and are freely movable with respect thereto, as shown in the drawings, it is also possible to provide an arrangement where a spring means corresponding to the pair of springs 13 is connected only directly between the walls 12 so as to urge them toward each other.

What is claimed is:

1. In a device for releasably holding at least one movable body at a given position with respect to another body, a pair of opposed end walls which are spaced from each other, a pair of opposed elongated fixed walls also spaced from each other and extending between and being fixed to said end walls for forming therewith a frame which surrounds a given space, a pair of opposed parallel clamping walls extending across said space between said fixed walls and at least one of said clamping walls being completely separate from and unconnected to any of the other walls so as to be freely movable away from the other of said clamping walls to a position where said one movable clamping wall is adapted to press against the movable body for releasably holding the latter, a control plate situated in said space between and extending parallel to and being spaced from said clamping walls with said control plate having a pair of opposed faces which are respectively directed toward inner surfaces of said clamping walls which are directed toward each other, a pair of rows of tiltable spreading means one of which is a mirror image of the other, said rows being respectively situated on opposite sides of and engaging said faces of said control plate and having distant from the latter end surfaces engaging said inner surfaces of said clamping walls, a plurality of spring means respectively cooperating with said spreading means for urging the latter to tilt, in response to movement of said control plate in a clamping direction between said end walls, in a direction spreading said one clamping wall away from the other clamping wall, while remaining parallel thereto, to a location adapted to press against a movable body for releasably holding the latter, urging means operatively connected at least with said one clamping wall for displacing the latter with respect to said fixed walls back toward the other clamping wall to a location adapted to release the movable body for movement, in response to movement of said control plate in an opposite, non-clamping direction between said end walls, said urging means being the only structure which maintains said one clamping wall assembled with the other structure and in engagement with said end surfaces of one of said rows of tiltable spreading means, and moving means operatively connected with said control plate for moving the latter in said clamping direction or in said non-clamping direction to situate at least said one movable clamping wall either in a holding position, adapted to hold the movable body against movement, or in a release position, adapted to release the body for movement, respectively.

2. The combination of claim 1 and wherein said urging means cooperates with said movable clamping wall for urging the latter with a spring force away from said holding position toward said release position while maintaining the inner surface of said one clamping wall in engagement with one of the rows of spreading means.

3. The combination of claim 2 and wherein said urging means includes a pair of wire springs respectively connected to said frame, situated outwardly beyond and extending along said fixed walls, and respectively having free ends engaging said movable clamping wall for urging the latter toward said release position thereof.

4. The combination of claim 3 and wherein said frame has a pair of projections while said wire springs respectively have loops which surround said projections for connecting said wire springs to said frame.

5. The combination of claim 1 and wherein both of said clamping walls are entirely separate from and freely movable with respect to said frame while remaining parallel to each other and both rows of said spreading means acting on said clamping walls for simultaneously spreading the same apart from each other, while maintaining said clamping walls parallel to each other, in response to movement of said control plate in said clamping direction, and said urging means being operatively connected with both of said clamping walls for simultaneously displacing the same inwardly toward each other respectively to release positions in reponse to movement of said control plate in said non-clamping direction, said urging means also forming the only structure which maintains the other of said clamping walls assembled with the remaining elements and in engagement with said end surfaces of the other of said rows of tiltable spreading means.

6. The combination of claim 5 and wherein said urging means includes a pair of elongated wire springs between which said fixed walls are located with each wire spring having a pair of free ends respectively connected operatively with the pair of clamping walls for urging them toward each other.

7. The combination of claim 6 and wherein each wire spring has a pair of elongated springy legs respectively terminating in said free ends and an intermediate portion extending between said legs.

8. The combination of claim 7 and wherein said intermediate portion of each wire spring is symmetrically situated with respect to said legs thereof and forms with said legs a pair of loops, and said frame having projections respectively received in said loops for connecting said wire springs with said frame.

9. The combination of claim 5 and wherein each clamping wall has a pair of opposed side edges operatively connected with free ends of said wire springs to be urged thereby to its release position.

10. The combination of claim 1 and wherein said one movable clamping wall when in its release position engages and is pressed against said fixed walls by said urging means.

* * * * *